(12) United States Patent
Toy et al.

(10) Patent No.: US 11,585,637 B2
(45) Date of Patent: Feb. 21, 2023

(54) SYSTEM FOR AIMING DOWN A SIGHTING APPARATUS IN A VIRTUAL REALITY ENVIRONMENT

(71) Applicant: Raytheon Company, Waltham, MA (US)

(72) Inventors: Gregory K. Toy, Tucson, AZ (US); Michael D. Wetherill, Jr., Indianapolis, IN (US); Christopher A. Velez, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 249 days.

(21) Appl. No.: 16/995,470

(22) Filed: Aug. 17, 2020

(65) Prior Publication Data

US 2022/0049930 A1    Feb. 17, 2022

(51) Int. Cl.
*G06F 3/01* (2006.01)
*F41G 3/26* (2006.01)

(52) U.S. Cl.
CPC ............... *F41G 3/26* (2013.01); *G06F 3/012* (2013.01)

(58) Field of Classification Search
CPC ... F41G 3/26; G06F 3/012; G02B 2027/0138; G02B 2027/014; G02B 27/0093; G02B 27/0172; G09B 5/06; G09B 9/003; F41A 33/00
See application file for complete search history.

(56) References Cited

U.S. PATENT DOCUMENTS

| 5,641,288 A * | 6/1997 | Zaenglein, Jr. | ........ F41G 3/2633 434/21 |
|---|---|---|---|
| 2015/0226509 A1* | 8/2015 | Hadler | .................. F41A 33/06 434/18 |
| 2020/0341542 A1* | 10/2020 | Kur | ......................... G06F 3/012 |

OTHER PUBLICATIONS

"International Application Serial No. PCT US2021 046132, International Search Report dated Dec. 1, 2021", 4 pgs.
"International Application Serial No. PCT US2021 046132, Written Opinion dated Dec. 1, 2021", 7 pgs.

* cited by examiner

*Primary Examiner* — Phuong H Nguyen
(74) *Attorney, Agent, or Firm* — Schwegman Lundberg & Woessner, P.A.

(57) ABSTRACT

A system determines a location of a sighting apparatus for a weapon simulator in three-dimensional space using a three-dimensional positional tracking system. Upon placement of a virtual reality (VR) head mounted display (HMD) in proximity to the sighting apparatus for the weapon simulator, the system determines a location of the VR HMD in three-dimensional space using the tracking system. The system then analyzes the relationship between the locations of the virtual trainer and the VR HMD, and upon determining that the VR HMD is properly positioned in relation to the virtual trainer, the system locks a visual feed to the VR HMD.

16 Claims, 4 Drawing Sheets

SYSTEM FOR AIMING DOWN A SIGHTING APPARATUS IN A VIRTUAL REALITY ENVIRONMENT

TECHNICAL FIELD

The present disclosure relates to a sighting system for a virtual reality environment, and in an embodiment, but not by way of limitation, a sighting system for a personal-portable air defense virtual trainer.

BACKGROUND

When a person is attempting to aim a personal-portable air defense virtual trainer, such as a man portable air defense system (MANPADS) virtual trainer, which is a particular instantiation of a training aids, devices, simulators, and simulations (TADSS) device, it is difficult for that person to position their head correctly in relation to the MANPADS trainer or other TADSS device. The causes for this difficulty are that the user, because they are wearing a virtual reality (VR) head mounted display (HMD), cannot see the MANPADS trainer or other TADSS device that they are holding. Also, the HMD adds bulk to their head, further preventing the person from correctly positioning their head. Additionally, it is difficult for an untrained person to precisely align their head and the MANPADS trainer or other TADSS device.

DETAILED DESCRIPTION

Figure 1:
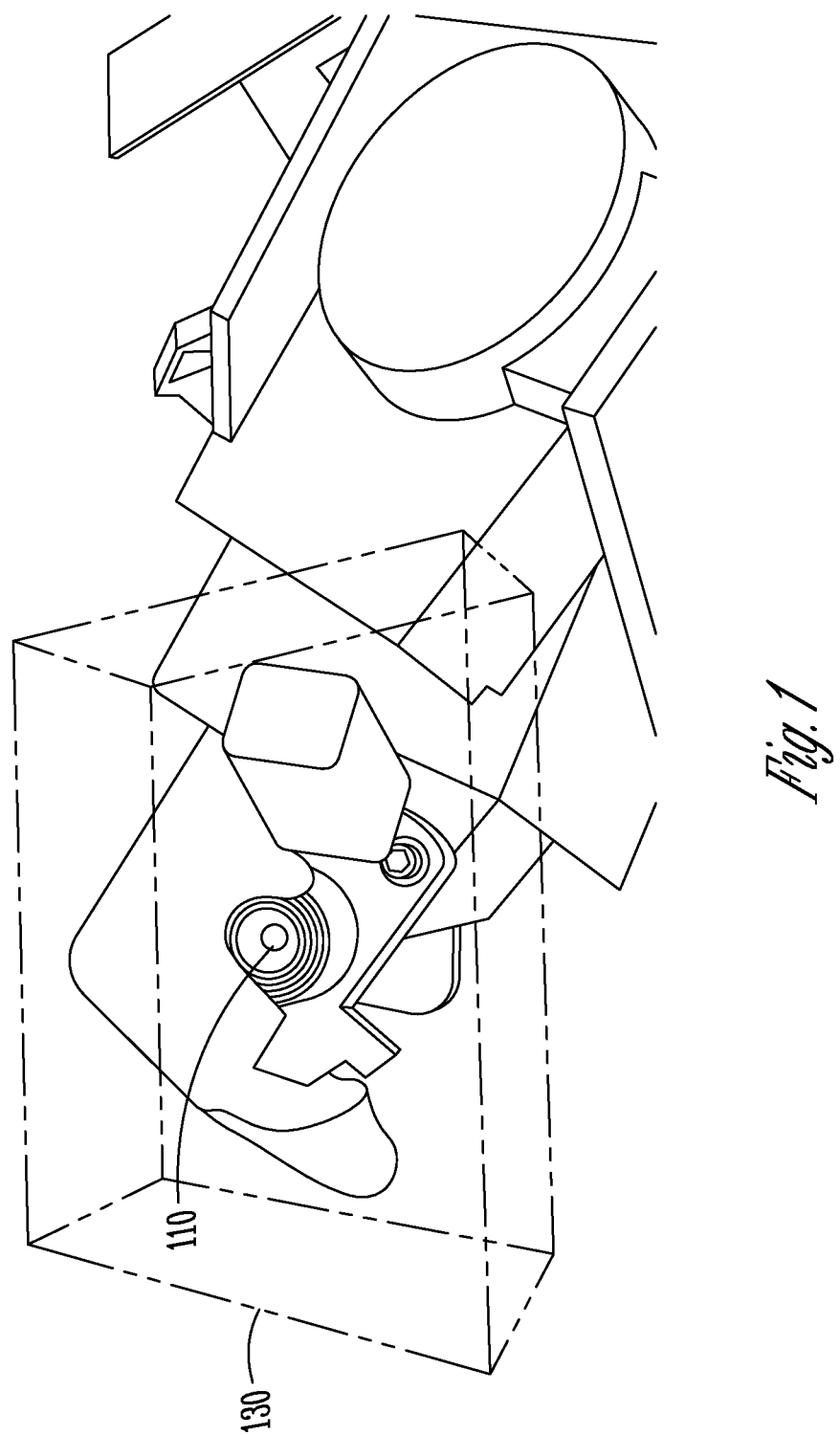
FIG. 1 is a diagram illustrating a view of a personal-portable air defense virtual trainer in virtual reality.

In the following description, for purposes of explanation, numerous specific details are set forth in order to provide a thorough understanding of the various aspects of different embodiments of the present invention. It will be evident, however, to one skilled in the art that the present invention may be practiced without all the specific details and/or with variations, permutations, and combinations of the various features and elements described herein.

A tactical man portable air defense system (MANPADS) is a weapon that a user normally rests on their shoulder, and which fires a projectile to counter an airborne vehicle such as a plane, helicopter, or drone. Many militaries through the world use such tactical MANPADS, and these same militaries also use training devices, which can generally be referred to as training aids, devices, simulators, and simulations (TADSS) devices, to train persons on the use of tactical MANPADS. When a person is training in virtual reality (VR) on such TADSS devices, and in particular is attempting to aim a TADSS device, it is difficult for that person to position their head correctly in relation to the TADSS device. The causes for this difficulty are that the user, because they are wearing a virtual reality (VR) head mounted display (HMD), cannot see the TADSS device that they are holding. Also, the HMD adds bulk to their head, further preventing the person from correctly positioning their head. Additionally, it is difficult for an untrained person to precisely align their head and the TADSS device. Moreover, a small percentage of virtual reality users experience signs of simulation sickness when using virtual reality simulators. While embodiments of this disclosure are described primarily in connection with air defense applications, such embodiments are also applicable in any application where a user puts their head up to any type of sighting or aiming system, including civilian and non-defense related applications. For example, such embodiments are also applicable to any training or gaming application that requires the user to properly position their head in order to aim down a set of sights. As a further example, embodiments could be used for surveyor training wherein a surveyor in training could use these embodiments to properly aim and position a theodolite device.

In an embodiment, a software method, which can be referred to as a "SightLock" feature, allows a user to receive instant feedback when they are physically positioning a TADSS device correctly on their shoulder. The view in the VR HMD smoothly snaps in and out of the virtual sight frame allowing the user to aim down sights (ADS) when they are holding the TADSS device correctly. More particularly, the view in the VR HMD snaps into the proper "aim down sites" position and holds it there, allowing the user to have the proper sight picture of what they are aiming at. This provides invaluable muscle memory for trainees in virtual reality as it replicates the real-world equivalent of placing one's eye up to the rear sight on a physical sight frame on a tactical MANPADS launcher.

An embodiment works in conjunction with a modified sight frame assembly of a TADSS device, which makes the embodiment more realistic for the user. However, the modified sight frame assembly is not required for operation of this embodiment. Some MANPADS training devices include a sight frame assembly, which makes the training regime more realistic. However, in the virtual reality training environment, the VR HMD prevents the user from properly placing their head in relation to the virtual TADSS device, and in particular, the sight frame assembly.

An embodiment tracks the position of a person's head in relation to the physical TADSS device that they are holding. When the person puts their head in the correct position, and the person places their eye in a proper position in relation to the TADSS device, the view in the VR HMD is locked in place. That is, the MANPADS geometry in the virtual reality generated scene does not change so that the person can look down the sights in a clear sight picture. This locking feature solves the inherent jitter involved in virtual reality. This feature locks the 3D model of the weapon to the position of the user's head (if held correctly), and it potentially reduces the chance of simulation sickness occurring due to having the TADSS device in synchronization with the user's movements.

When a user properly positions the TADSS device to their VR HMD, a collision area, represented by a small virtual collision zone, is activated in the software which locks the user's point of view (POV) down the software-generated reticles or sights, reducing the potential for simulation sickness and allowing the user to stay on target. At a high level, the determination that the VR HMD is in the proper position in relation to the TADSS device is as follows. A gaming engine determines the locations of the TADSS device and the VR HMD in 3D space. The system is programmed to know what the correct location of the VR HMD in 3D space should be in relation to the TADSS device. That correct location is marked by the software via the collision zone and/or a box surrounding the collision zone. If the VR HMD is within the collision zone and/or the box, the visual feed to the VR HMD is locked.

FIG. 1 is a diagram illustrating a simulated virtual reality view of a personal-portable air defense virtual trainer. That is, FIG. 1 illustrates what a user of a TADSS device sees in the virtual reality environment when using an embodiment of this disclosure. It can be referred to as a first-person view. When the person's head is within the collision area (or collision zone) 110, their head is in the correct position, and they will be looking down the computer-generated reticles or eye sights. It is noted that the collision zone 110 is not visible to the person wearing the headset. The collision zone 110 is a marker for the software, indicating that when the person's head is within the collision zone, their head is in the correct position and the sight picture is then locked. After the sight picture is locked, the sight picture will not change until the person physically moves away from the TADSS device. The user, by correctly placing their head in relation to the TADSS device, causes the software to determine that their head is within the collision zone. This process is discussed in more detail in connection with FIGS. 2 and 3. The correct positioning of the user's heard eliminates the natural error of the virtual reality system so that the training is a seamless experience for the user. The geometry of the simulated environment is locked to the position of the person's head, so that when the user holds their head still, the inherent error in the virtual reality system does not cause the view to be constantly redrawn.

The software constantly monitors the position of the person's head (via the position of the VR HMD) in relation to the TADSS device that the person is holding. This all becomes active when the zone (position of the head) is in the middle of the box 130 in FIG. 1. At that point, the person has the sight line until the person moves their head out of box 130.

Whenever the user moves the TADSS device, the software must update the position of the TADSS device. As detailed below in FIGS. 2 and 3, this involves updating the rotation of the TADSS device, or the movement of the TADSS device to the left and right and up and down. This is the rotation of the TADSS device (not the VR HMD). The TADSS device is rotated in 3D space in order to match the rotation of actual TADSS device by the user in real space. A feature is the ability to move the MANPADS simulator in the elevation (up and down) angle while at the same time keeping the SightLock feature active.

When the software determines that the user's head is within the box 130, it can be concluded that the user is aiming down the sights. The sight lock feature is then activated at that point. Upon overlap (see FIGS. 2 and 3), the software attaches the user to the TADSS device. The software then properly orients the VR HMD and the TADSS device in the virtual environment. At the end of overlap, the user's head is moved out of the box 130. That is, the VR HMD has moved away from the TADSS device.

When the position of the VR HMD overlaps with the position of the TADSS, the software locks the visual feed to the VR HMD. The TADSS, which is associated with a 3D point in space from a game engine tracker, is then associated with the VR HMD, and that generates a position product. The box 130 moves relative to the TADSS device, that is, it follows the movement of the TADSS device. The software also tracks the VR HMD, and when VR HMD and box 130 meet in the correct position, that is when the point of view that the user sees is coupled to the sight in the virtual reality environment. At that point, the user should be able to aim down the sights. However, the position of the TADSS device is not updated based on the actual physical position of the physical TADSS device. Rather, it is updated based on the direction at which the user's headset is pointed.

Figure 2:
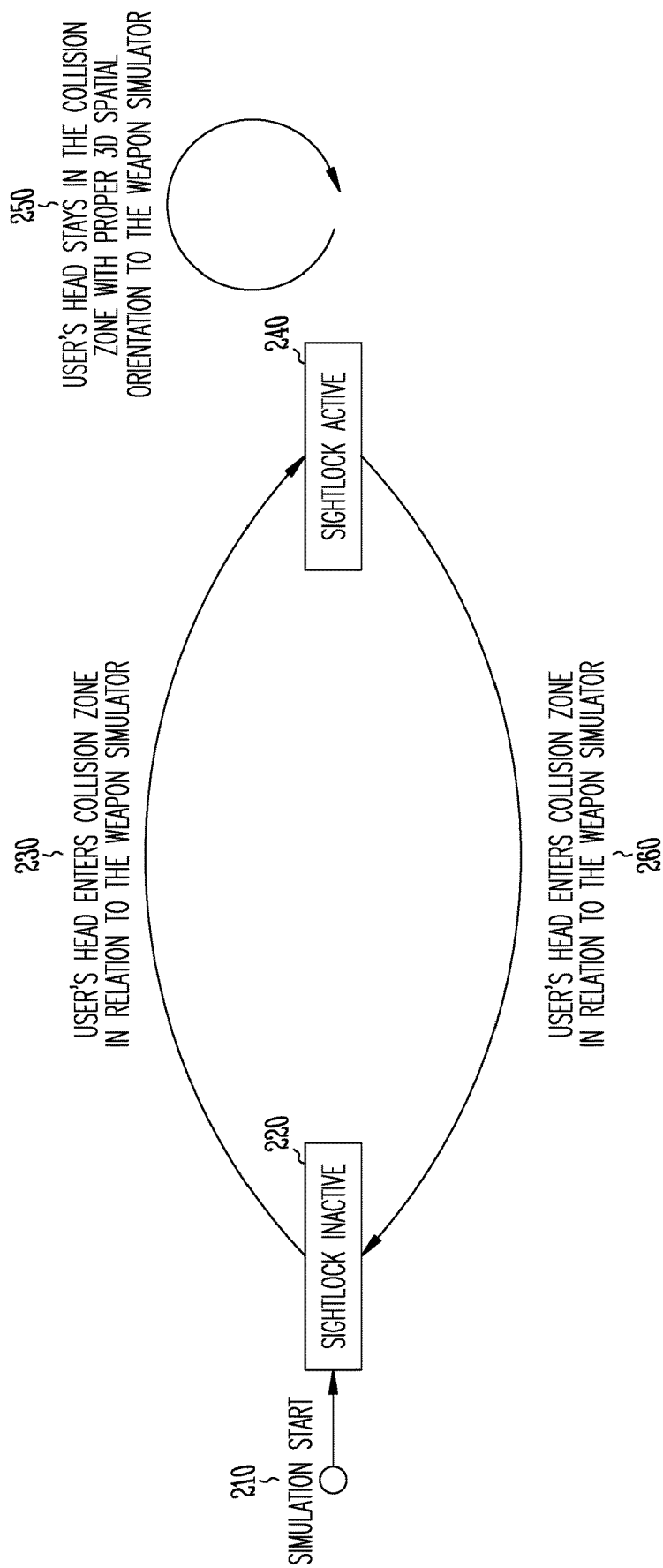
FIG. 2 is a block diagram illustrating a method to permit a user to properly align a virtual reality (VR) head mounted display (HMD) in relation to a personal-portable air defense virtual trainer.

FIG. 2 is a high-level diagram of a process to update a sight lock, thereby locking down the view of a user of a personal-portable air defense system virtual trainer so that the user can properly aim down the sights in the virtual trainer. The simulation begins at 210, and at the beginning, the sight lock is inactive at 220. At 230, the system detects that the user's head is entering the collision zone (FIG. 1, 110), and the sight lock becomes active at 240. As indicated at 250, the sight lock remains active as long as the user's head (VR HMD) stays within the collision zone and with proper 3D spatial orientation to the weapon simulator. At 260, when the user's head exits the collision zone in relation to the weapon simulator, the system returns to the sight lock inactive state at 220.

Figure 3:
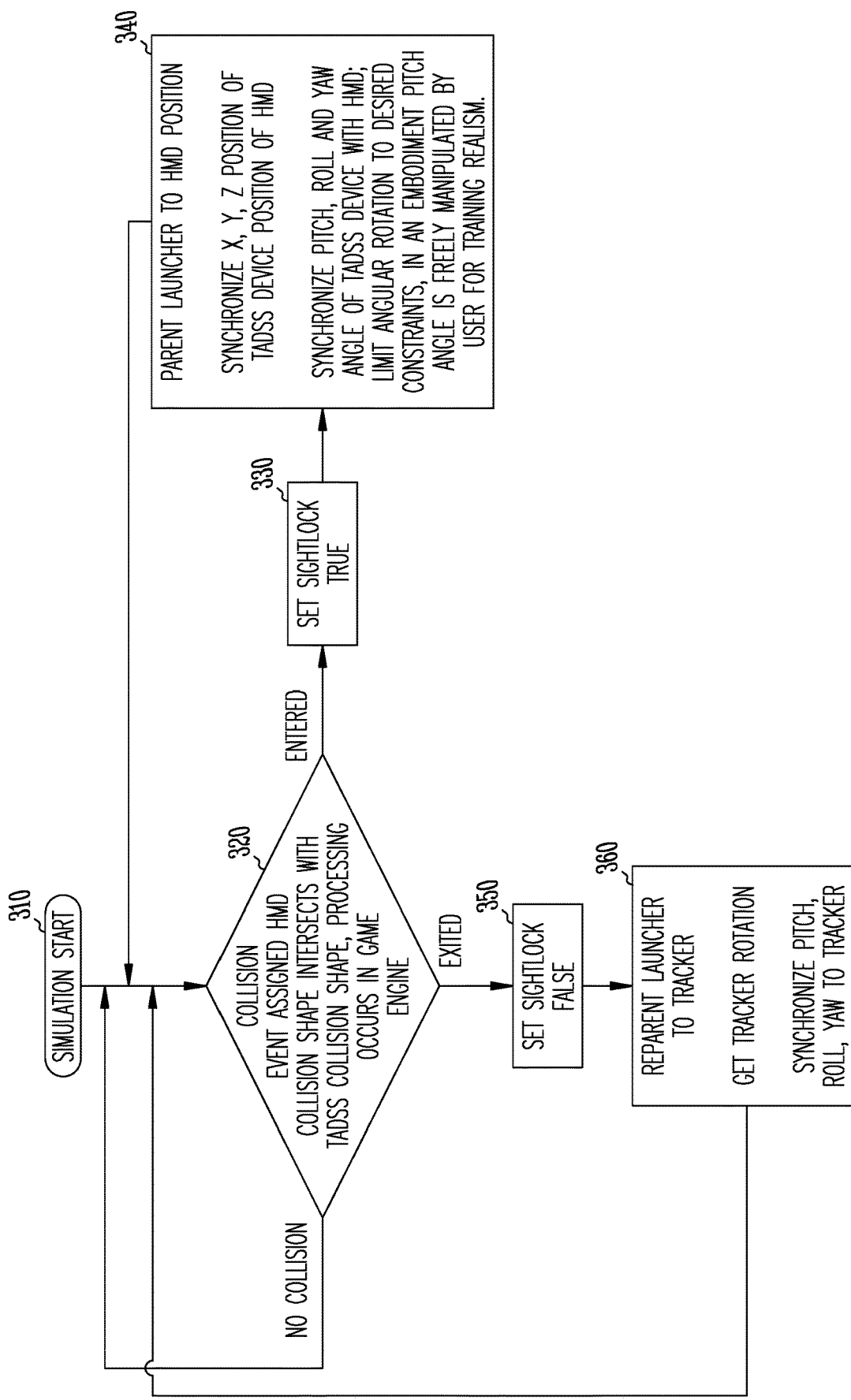
FIG. 3 is a block diagram illustrating another method to permit a user to properly align a virtual reality (VR) head mounted display (HMD) in relation to a personal-portable air defense virtual trainer.

FIG. 3 is a more detailed diagram of the process of locking down the sights in a virtual trainer. The system commences its simulation operation at 310, and it determines if there is a collision event at 320. As noted above, a collision event is when a user's VR HMD enters the software-generated collision zone. More specifically, the system is programmed with the three-dimensional shape of the VR HMD and the three-dimensional shape of the TADSS device, and when two programmed shapes attached to the VR HMD and TADSS device three-dimensional shape intersect, the system can determine that a collision event has occurred. In an embodiment, the determination of a collision event can be executed with a typical VR gaming engine. If no collision event has occurred at 320, the system loops back to continue to monitor for a collision event.

If the system detects a collision event, that is, the user's VR HMD has entered the collision zone, the sight lock is set to true at 330, and the weapon simulation launcher is attached to or associated with the user's VR HMD at 340. This attachment or association involves synchronizing the x, y, and z position of the TADSS device with the x, y, and z position of the user's VR HMD. This further involves synchronizing the pitch, roll, and yaw angle of the TADSS device with the pitch, roll, and yaw angle of the user's VR HMD. In connection with these operations, the angular rotations are limited to any desired constraints. For example, the system can constrain the positioning of the TADSS between the angles of 25 degrees to 75 degrees in relation to parallel. In another embodiment, the pitch angle of the TADSS can be freely manipulated by the user so that the training is more realistic.

The sight lock feature stays active at 340, until the user's VR HMD exits the collision zone, and then the sight lock feature is set to false at 350. Thereafter, at 360, the simulation launcher is detached or disassociated from the user's VR HMD, and the simulation launcher is re-attached to or re-associated with the VR tracker of the gaming engine. The rotation of the tracker is determined, and the pitch, yaw, and roll of the TADSS device is synchronized to the VR tracker. Thereafter, system returns to determine the next collision event at 320.

Figure 4:
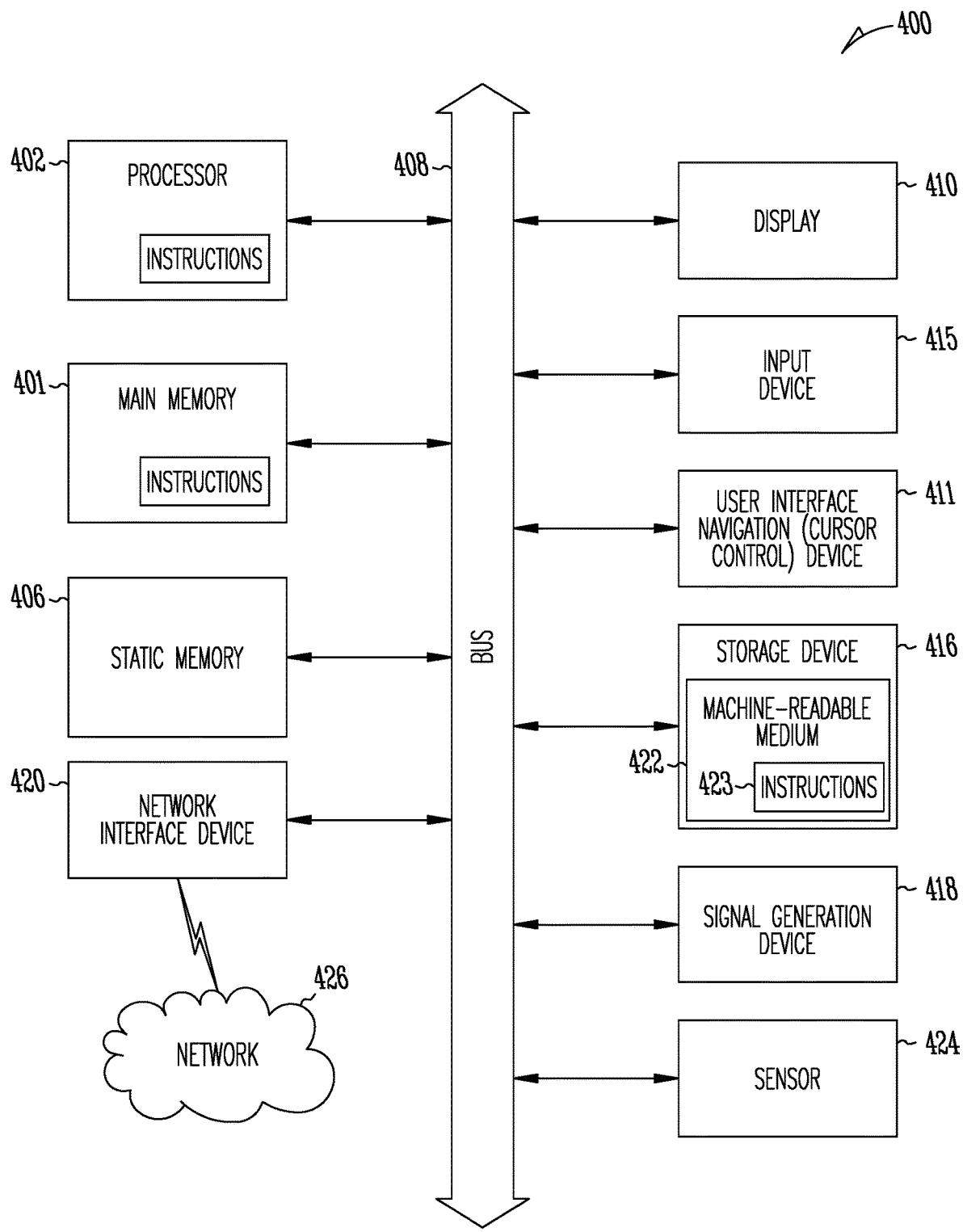
FIG. 4 is a block diagram of a computer architecture upon which one or more embodiments of the present disclosure can execute.

FIG. 4 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 401 and a static memory 406, which communicate with each other via a bus 408. The computer system 400 may further include a display unit 410, an alphanumeric input device 415 (e.g., a keyboard), and a user interface (UI) navigation device 411 (e.g., a mouse). In one embodiment, the display, input device and cursor control device are a touch screen display. The computer system 400 may additionally include a storage device 416 (e.g., drive unit), a signal generation device 418 (e.g., a speaker), a network interface device 420, and one or more sensors 424, such as a global positioning system sensor, compass, accelerometer, or other sensor.

The storage device 416 includes a machine-readable medium 422 on which is stored one or more sets of instructions and data structures (e.g., software 423) embodying or utilized by any one or more of the methodologies or functions described herein. The software 423 may also reside, completely or at least partially, within the main memory 401 and/or within the processor 402 during execution thereof by the computer system 400, the main memory 401 and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 423 may further be transmitted or received over a communications network 426 using a transmission medium via the network interface device 420 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process comprising:
    determining a first location of a sighting system virtual trainer in three-dimensional space using a three-dimensional positional tracking system;
    upon placement of a virtual reality (VR) head mounted display (HMD) in proximity to the sighting system virtual trainer, determining a second location of the VR HMD in three-dimensional space using the three-dimensional positional tracking system;
    analyzing a relationship between the first location and second location; and
    upon a determination that the VR HMD is properly positioned in relation to the sighting system virtual trainer based on the analysis of the relationship between the first location and second location, locking a visual feed to the VR HMD;
    wherein the determination that the VR HMD is properly positioned comprises a determination that a user can look down an aiming sight line of the sighting system virtual trainer; and
    wherein the determination that the user can look down the aiming sight line of the sighting system virtual trainer comprises a determination that the VR HMD is positioned within a software-defined virtual collision zone of the sighting system virtual trainer.

2. The process of claim 1, wherein the sighting system virtual trainer comprises a personal-portable air defense virtual trainer.

3. The process of claim 1, wherein the sighting system virtual trainer comprises a man portable air defense system (MANPADS) virtual trainer.

4. The process of claim 1, wherein the sighting system virtual trainer comprises a training aids, devices, simulators, and simulations (TADSS) device.

5. The process of claim 1, wherein the aiming sight line comprises one or more of a first virtual reticle and a second virtual reticle.

6. The process of claim 5, comprising using a physical aiming apparatus in connection with the aiming sight line.

7. The process of claim 1, wherein the VR HMD is positioned on a head of a user of the sighting system virtual trainer.

8. The process of claim 1, wherein the analysis of the relationship between the first location and second location comprises use of a virtual reality gaming engine.

9. The process of claim 1, wherein the three-dimensional positional tracking system comprises one or more of infrared sensors placed on the sighting system virtual trainer and the VR HMD, a plurality of cameras, and an inside-out tracking method.

10. A non-transitory computer-readable medium comprising instructions that when executed by a processor execute a process comprising:
   determining a first location of a sighting system virtual trainer in three-dimensional space using a three-dimensional positional tracking system;
   upon placement of a virtual reality (VR) head mounted display (HMD) in proximity to the sighting system virtual trainer, determining a second location of the VR HMD in three-dimensional space using the three-dimensional positional tracking system;
   analyzing a relationship between the first location and second location; and
   upon a determination that the VR HMD is properly positioned in relation to the sighting system virtual trainer based on the analysis of the relationship between the first location and second location, locking a visual feed to the VR HMD;
   wherein the determination that the VR HMD is properly positioned comprises a determination that a user can look down an aiming sight line of the sighting system virtual trainer; and
   wherein the determination that the user can look down the aiming sight line of the sighting system virtual trainer comprises a determination that the VR HMD is positioned within a software-defined virtual collision zone of the sighting system virtual trainer.

11. The non-transitory computer-readable medium of claim 10, wherein the sighting system virtual trainer comprises a personal-portable air defense virtual trainer.

12. The non-transitory computer-readable medium of claim 10, wherein the sighting system virtual trainer comprises a man portable air defense system (MANPADS) virtual trainer.

13. The non-transitory computer-readable medium of claim 10, wherein the sighting system virtual trainer comprises a training aids, devices, simulators, and simulations (TADSS) device.

14. The non-transitory computer-readable medium of claim 10, wherein the aiming sight line comprises one or more of a first virtual reticle and a second virtual reticle.

15. The non-transitory computer-readable medium of claim 14, comprising instructions for using a physical aiming apparatus in connection with the aiming sight line.

16. A system comprising:
   a sighting system virtual trainer; and
   a virtual reality (VR) head mounted display (HMD);
   wherein the system is operable for:
   determining a first location of the sighting system virtual trainer in three-dimensional space using a three-dimensional positional tracking system;
   upon placement of the VR HMD in proximity to the sighting system virtual trainer, determining a second location of the VR HMD in three-dimensional space using the three-dimensional positional tracking system;
   analyzing a relationship between the first location and second location; and
   upon a determination that the VR HMD is properly positioned in relation to the sighting system virtual trainer based on the analysis of the relationship between the first location and second location, locking a visual feed to the VR HMD;
   wherein the determination that the VR HMD is properly positioned comprises a determination that a user can look down an aiming sight line of the sighting system virtual trainer; and
   wherein the determination that the user can look down the aiming sight line of the sighting system virtual trainer comprises a determination that the VR HMD is positioned within a software-defined virtual collision zone of the sighting system virtual trainer.

\* \* \* \* \*